(12) United States Patent
Ikeda et al.

(10) Patent No.: US 9,523,511 B2
(45) Date of Patent: Dec. 20, 2016

(54) INDOOR UNIT OF AIR-CONDITIONING APPARATUS

(71) Applicant: Mitsubishi Electric Corporation, Tokyo (JP)

(72) Inventors: Hisanori Ikeda, Tokyo (JP); Masato Ishikawa, Tokyo (JP); Akimoto Suzuki, Tokyo (JP); Masahide Kinami, Tokyo (JP); Youhei Koyanagi, Tokyo (JP); Takuya Goto, Tokyo (JP); Katsuya Ishigami, Tokyo (JP); Shinji Kawai, Tokyo (JP); Yosuke Naito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/813,194

(22) Filed: Jul. 30, 2015

(65) Prior Publication Data

US 2016/0040901 A1 Feb. 11, 2016

(30) Foreign Application Priority Data

Aug. 6, 2014 (JP) ................................ 2014-160039

(51) Int. Cl.
*H04B 3/36* (2006.01)
*F24F 11/00* (2006.01)
(Continued)

(52) U.S. Cl.
CPC ............ *F24F 11/006* (2013.01); *F24F 1/0007* (2013.01); *F24F 11/0086* (2013.01); *F24F 13/20* (2013.01);
(Continued)

(58) Field of Classification Search
CPC ...... F24F 11/006; F24F 11/0086; F24F 13/20; F24F 1/0007; F24F 2011/0068; F24F 2011/0071; F24F 2013/207; G08C 2201/42; H04L 12/2838; H04L 2012/2841; H04L 2012/285; H04Q 1/023; H04Q 9/00
(Continued)

(56) References Cited

U.S. PATENT DOCUMENTS 5,664,428 A * 9/1997 Sugiyama ............. F24F 1/0007
 62/259.1
5,890,371 A * 4/1999 Rajasubramanian . F24F 5/0042
 165/104.21
(Continued)

FOREIGN PATENT DOCUMENTS

EP 1533576 A2 5/2005
GB EP 1533576 A3 * 8/2006 ................ F24F 1/00
(Continued)

OTHER PUBLICATIONS

Extended European Search Report issued Dec. 11, 2015 in the corresponding EP application No. 15179383.3.

*Primary Examiner* — Tan H Trinh
(74) *Attorney, Agent, or Firm* — Posz Law Group, PLC

(57) ABSTRACT

An indoor unit of an air-conditioning apparatus includes a housing having a wall extending in a horizontal direction, and a front panel covering at least a part of a front side of the wall. On a region of the wall covered by the front panel, an opening leading to a front end of a space in which a network repeater for wirelessly communicating with a network is to be contained is formed. The opening is configured to be exposed in a state in which a whole or a part of the front panel is removed or opened.

6 Claims, 6 Drawing Sheets

(51) Int. Cl.
*F24F 1/00* (2011.01)
*H04Q 1/02* (2006.01)
*H04Q 9/00* (2006.01)
*F24F 13/20* (2006.01)
*H04L 12/28* (2006.01)

(52) U.S. Cl.
CPC ......... *H04L 12/2838* (2013.01); *H04Q 1/023* (2013.01); *H04Q 9/00* (2013.01); *F24F 2011/0068* (2013.01); *F24F 2011/0071* (2013.01); *F24F 2013/207* (2013.01); *G08C 2201/42* (2013.01); *H04L 2012/285* (2013.01); *H04L 2012/2841* (2013.01)

(58) Field of Classification Search
USPC .......... 455/7, 41.1, 41.2, 358; 340/5.5, 5.53, 340/3.54; 700/90, 282, 276; 709/229, 224; 236/51; 62/180, 228.1, 160, 324.6, 201, 62/126, 259.2, 407, 127, 125; 165/62; 370/401; 345/173, 156
See application file for complete search history.

(56) References Cited

U.S. PATENT DOCUMENTS

| | | | | |
|---|---|---|---|---|
| 7,975,495 | B2* | 7/2011 | Voorhis | F24F 3/153 62/176.6 |
| 2002/0044042 | A1* | 4/2002 | Christensen | G05B 15/02 340/3.54 |
| 2003/0066897 | A1* | 4/2003 | Carner | G05D 23/1905 236/51 |
| 2003/0210126 | A1* | 11/2003 | Kanazawa | G07C 9/00142 340/5.5 |
| 2007/0131784 | A1* | 6/2007 | Garozzo | F24F 11/0009 236/51 |
| 2009/0013210 | A1* | 1/2009 | McIntosh | H04L 12/2697 714/4.1 |
| 2009/0090125 | A1* | 4/2009 | Seki | F24F 11/0078 62/407 |
| 2010/0182262 | A1* | 7/2010 | Yoshikawa | G06F 1/1601 345/173 |
| 2011/0211584 | A1* | 9/2011 | Mahmoud | H04L 12/2834 370/401 |
| 2011/0238223 | A1* | 9/2011 | Narayanamurthy | F24F 5/0046 700/277 |
| 2012/0191254 | A1* | 7/2012 | Cho | F24F 11/006 700/276 |
| 2012/0198874 | A1* | 8/2012 | Yamashita | F24F 3/06 62/160 |
| 2012/0302166 | A1* | 11/2012 | Yamaoka | H04W 8/22 455/41.1 |
| 2013/0083805 | A1* | 4/2013 | Lu | H04L 12/2807 370/401 |
| 2013/0191529 | A1* | 7/2013 | Sugaya | G06F 11/3051 709/224 |
| 2014/0083649 | A1* | 3/2014 | Ikeda | F24F 1/0014 165/70 |
| 2015/0017913 | A1* | 1/2015 | Kuroyama | G08C 17/00 455/41.1 |
| 2015/0059389 | A1* | 3/2015 | Liu | F24F 1/24 62/259.2 |
| 2015/0068234 | A1* | 3/2015 | Sugiyama | F24F 1/0003 62/126 |
| 2015/0119999 | A1* | 4/2015 | Terashima | H04L 12/2816 700/12 |
| 2015/0187207 | A1* | 7/2015 | Fujita | F24F 3/065 340/12.5 |
| 2015/0219352 | A1* | 8/2015 | Kobayashi | F24F 5/0096 700/276 |
| 2016/0003490 | A1* | 1/2016 | Motomura | F24F 5/001 62/196.1 |
| 2016/0033161 | A1* | 2/2016 | Koyanagi | F24F 1/0007 312/236 |
| 2016/0047566 | A1* | 2/2016 | Haga | H04L 12/28 702/184 |

FOREIGN PATENT DOCUMENTS

| | | | |
|---|---|---|---|
| JP | 2008-004975 A | 1/2008 | |
| JP | WO 2014020880 A1 * | 2/2014 | ............... H04Q 9/00 |
| JP | WO 2014024443 A1 * | 2/2014 | ............... F24F 11/02 |
| JP | WO 2014024444 A1 * | 2/2014 | ............... F24F 11/02 |
| JP | EP2881676 A1 * | 10/2015 | ............... H04Q 9/00 |
| WO | 2014/020880 A1 | 2/2014 | |

* cited by examiner

INDOOR UNIT OF AIR-CONDITIONING APPARATUS

TECHNICAL FIELD

The present invention relates to an indoor unit of an air-conditioning apparatus.

BACKGROUND ART

With spread of HEMS (Home Energy Management System), a smart grid, and other technologies, a demand for energy management of an air-conditioning apparatus has been increasing recently. Moreover, demands for central management control for managing the air-conditioning apparatus as well as other devices, remote operation for operating the air-conditioning apparatus from a remote location such as outside a house, and other conveniences have been increasing.

To meet these demands, an indoor unit of an air-conditioning apparatus provided with a network repeater for wirelessly communicating with a network has been proposed. The network repeater is connected to a control board incorporated in the indoor unit of the air-conditioning apparatus. Signals used for energy management of the air-conditioning apparatus, central management control, remote operation or another use are transmitted to and received from the network via the network repeater. Typically, the network repeater is provided with an indication lamp for indicating a communication state, an error state or another state. Also, the network repeater is typically provided with switches for switching on and off of wireless communication, recovering from an error, and other operations. The network repeater is provided on a wall surface in the vicinity of the indoor unit of the air-conditioning apparatus, for example (see Patent Literature 1, for example).

CITATION LIST

Patent Literature

Patent Literature 1: Japanese Unexamined Patent Application Publication No. 2008-4975 (FIG. 7, etc.)

SUMMARY OF INVENTION

Technical Problem

Some of the indication lamps provided on the network repeater may be normally lit or may flash, and when such a network repeater is installed in a conspicuous place, a user might feel uncomfortable. Moreover, since the network repeater itself is exposed, the user might feel that interior aesthetics of a room may be damaged. The network repeater can be incorporated in the indoor unit of the air-conditioning apparatus to improve the interior aesthetics. In such a case, however, the user can no longer visually check the communication state, the error state, and other states, or can no longer operate the switches, for example, and functionality is lowered. In other words, the conventional indoor unit of the air-conditioning apparatus cannot improve the interior aesthetics while ensuring the functionality.

The present invention has been made in view of the aforementioned problems and is to obtain an indoor unit of an air-conditioning apparatus capable of improving the interior aesthetics while ensuring the functionality.

Solution to Problem

An indoor unit of an air-conditioning apparatus according to the present invention includes a housing having a wall extending in a horizontal direction, and a front panel covering at least a part of a front side of the wall. An opening leading to a front end of a space in which a network repeater for wirelessly communicating with a network is to be contained is formed on a region of the wall covered by the front panel, and the opening is configured to be exposed in a state in which a whole or a part of the front panel is removed or opened.

Advantageous Effects of Invention

In the indoor unit of the air-conditioning apparatus according to the present invention, the opening leading to the front end of the space in which the network repeater for wirelessly communicating with the network is contained is formed on the region covered with the front panel of the wall of the housing, and the opening is exposed in the state in which the whole of or a part of the front panel is removed or open. Thus, the network repeater can be incorporated in the indoor unit of the air-conditioning apparatus to improve the interior aesthetics. Moreover, because the network repeater incorporated in the indoor unit of the air-conditioning apparatus can be taken out of the indoor unit of the air-conditioning apparatus and subjected to visual check and operations as necessary, the functionality can be ensured.

DESCRIPTION OF EMBODIMENTS

An indoor unit of an air-conditioning apparatus according to the present invention will be described below by using the drawings.

Configurations and other specifications described below are only an example, and the indoor unit of the air-conditioning apparatus according to the present invention is not limited to such configurations and other specifications. In each figure, reference signs are omitted as appropriate for duplicated or similar members or portions.

Embodiment 1

An indoor unit of an air-conditioning apparatus according to Embodiment 1 will be described.

<Configuration of Indoor Unit of Air-Conditioning Apparatus>

A configuration of the indoor unit of the air-conditioning apparatus according to Embodiment 1 will be described.

(Entire Configuration)

Figure 1:
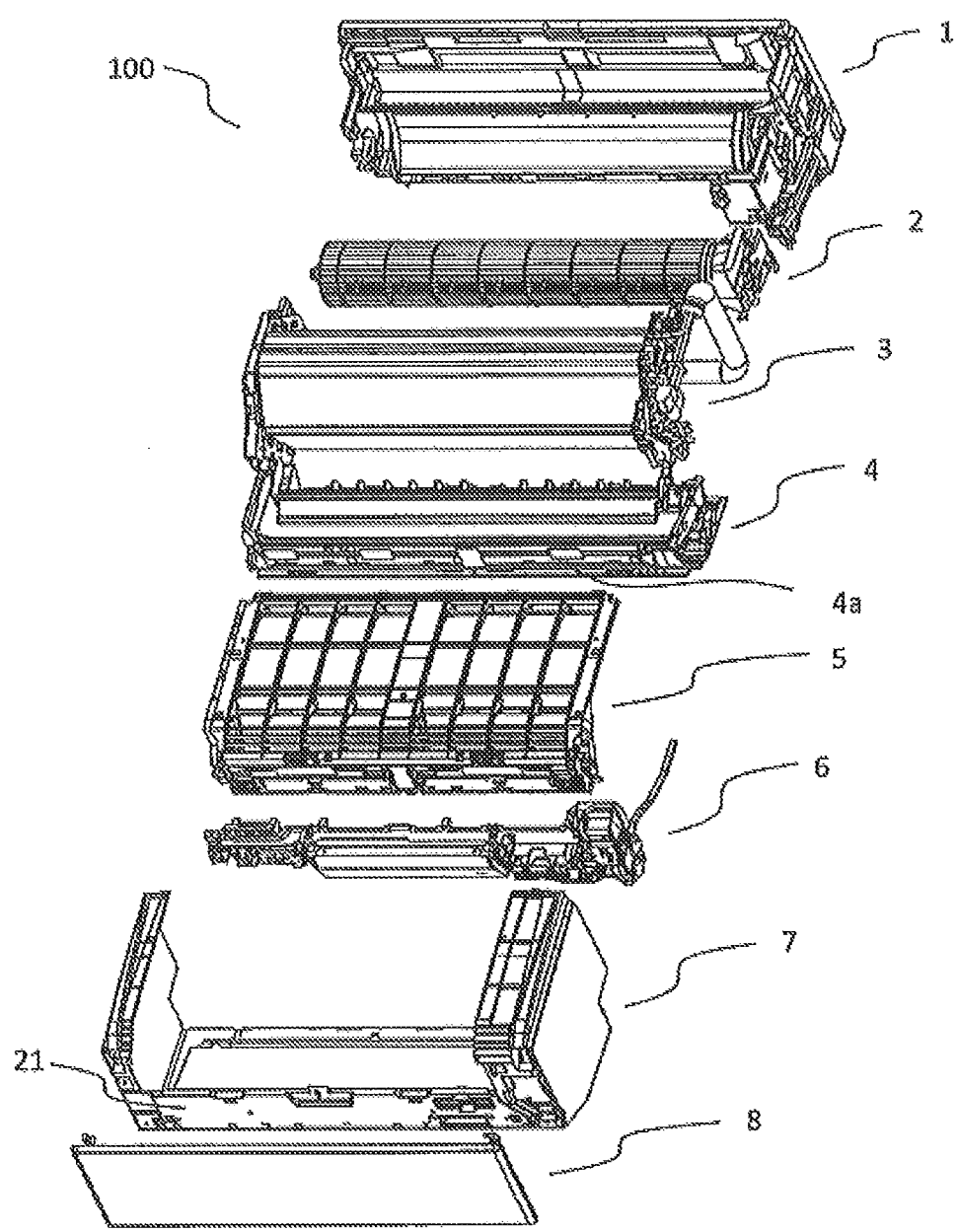
FIG. 1 is an exploded perspective view of an indoor unit of an air-conditioning apparatus according to Embodiment 1 of the present invention.
Figure 2:
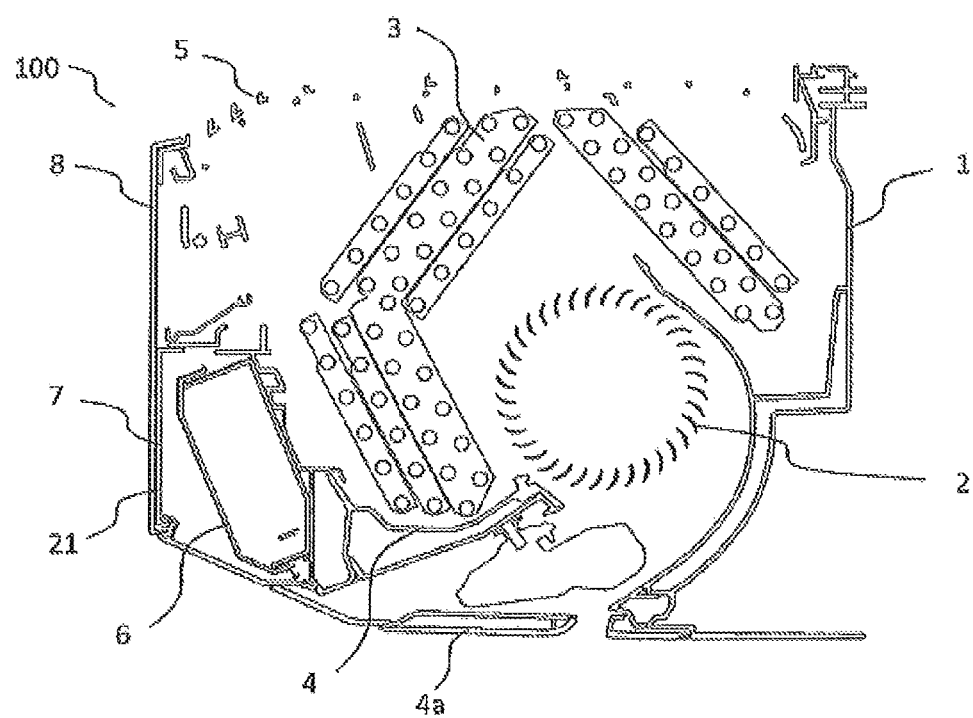
FIG. 2 is a cross-sectional view of the indoor unit of the air-conditioning apparatus according to Embodiment 1 of the present invention.

FIG. 1 is an exploded perspective view of the indoor unit of the air-conditioning apparatus according to Embodiment 1 of the present invention. FIG. 2 is a cross-sectional view of the indoor unit of the air-conditioning apparatus according to Embodiment 1 of the present invention.

As illustrated in FIGS. 1 and 2, the indoor unit 100 of the air-conditioning apparatus includes a base 1, a fan 2, a heat exchanger 3, a drain pan assembly 4, a filter automatic cleaning unit 5, an electrical component compartment member 6, a housing 7, and a front panel 8 (design panel). The drain pan assembly 4 has a vertical wind direction adjustment plate 4a.

On the base 1, the fan 2, the heat exchanger 3, and the drain pan assembly 4 on which the electrical component compartment member 6 is installed are installed. Moreover, on the base 1, the housing 7 on which the filter automatic cleaning unit 5 is installed is installed by a screw or the like. The housing 7 has a wall 21 extending in a horizontal direction. The wall 21 can be removed from the housing 7. The front panel 8 is installed on a front side of the housing 7, and a front side of the wall 21 is covered by the front panel 8. A user can attach and remove the front panel 8.

When the fan 2 is driven, an indoor air above the indoor unit 100 of the air-conditioning apparatus is suctioned through a filter installed on the filter automatic cleaning unit 5, is changed to a cold air, a warm air or the like by heat exchange in the heat exchanger 3, and the cold air, the warm air or the like passes through the vertical wind direction adjustment plate 4a of the drain pan assembly 4 and is blown out into a room. The vertical wind direction adjustment plate 4a rotationally moves, and adjusts a vertical wind direction of the air blown out of the indoor unit 100 of the air-conditioning apparatus.

(Configuration of Network Repeater)

A configuration of a network repeater contained in the indoor unit of the air-conditioning apparatus according to Embodiment 1 will be described.

Figure 3:
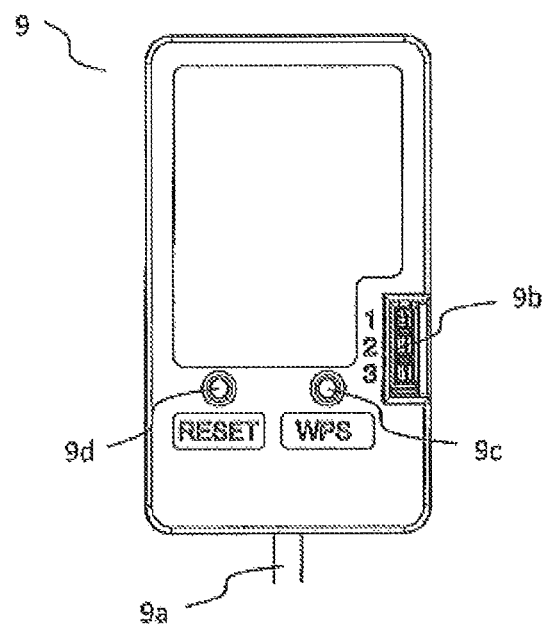
FIG. 3 is a front view of a network repeater to be contained in the indoor unit of the air-conditioning apparatus according to Embodiment 1 of the present invention.

FIG. 3 is a front view of the network repeater to be contained in the indoor unit of the air-conditioning apparatus according to Embodiment 1 of the present invention.

In the indoor unit 100 of the air-conditioning apparatus, the network repeater 9 as illustrated in FIG. 3 is contained. The network repeater 9 is connected to a control board 10, which will be described later, via a cable 9a and wirelessly communicates with a network such as LAN and WAN. For example, the network repeater 9 performs Wi-Fi communication with the network such as LAN and WAN.

On the network repeater 9, a plurality of indication lamps 9b for indicating a communication state and an error state, for example, is provided. The network repeater 9 is also provided with a switch 9c for switching on and off of wireless communication and a switch 9d for enabling or disabling a remote operation, for example.

(Configuration of Compartment of Network Repeater)

A configuration of a compartment of the network repeater of the indoor unit of the air-conditioning apparatus according to Embodiment 1 will be described.

Figure 4:
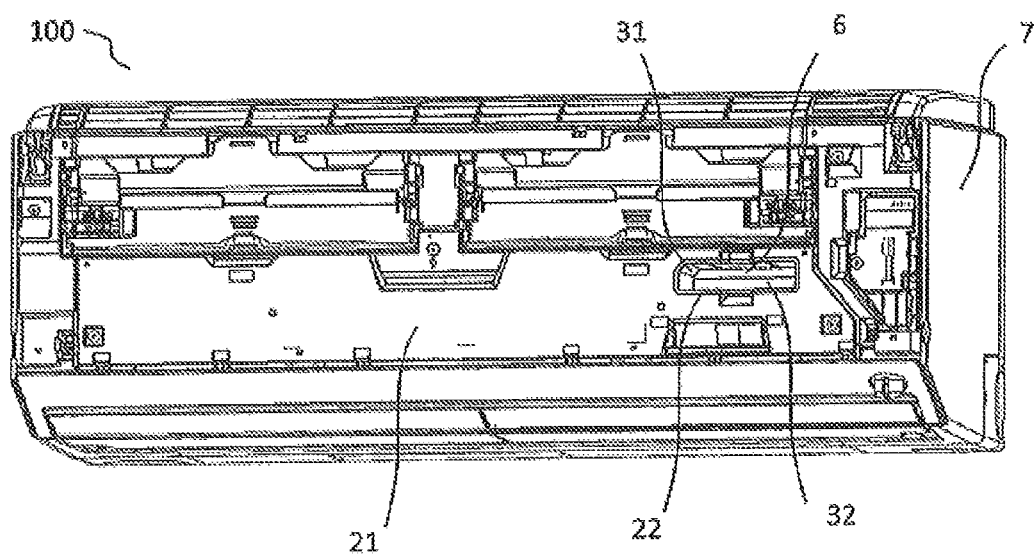
FIG. 4 is a perspective view of the indoor unit of the air-conditioning apparatus according to Embodiment 1 of the present invention in a state in which a front panel is removed.
Figure 5:
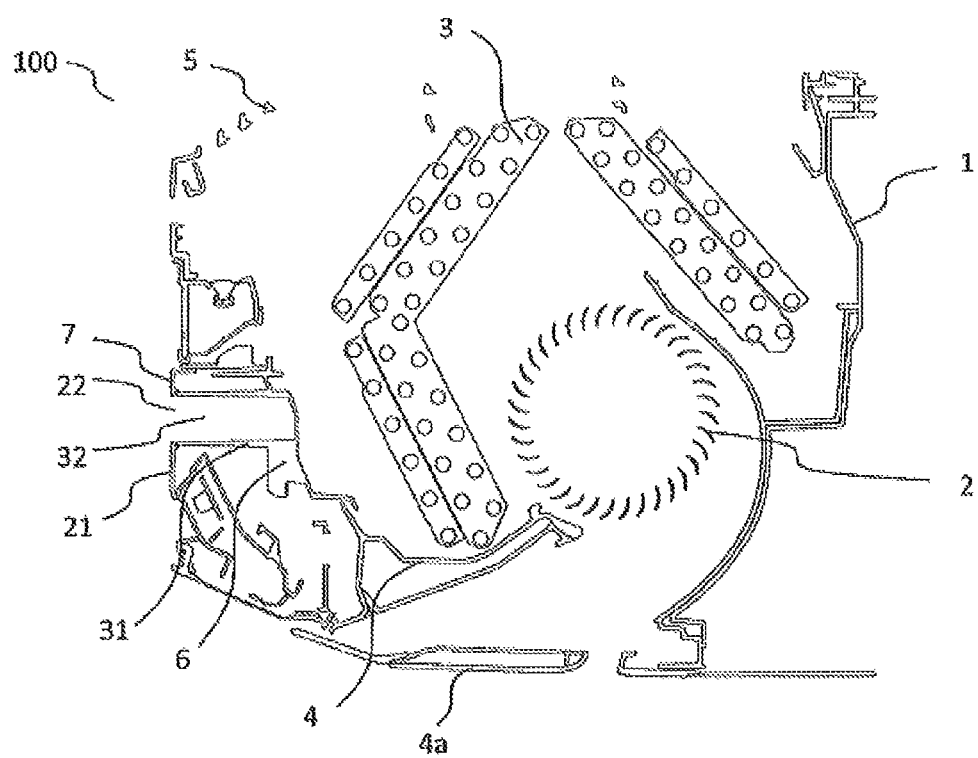
FIG. 5 is a cross-sectional view of the indoor unit of the air-conditioning apparatus according to Embodiment 1 of the present invention at an opening formed on a wall of a housing.
Figure 6:
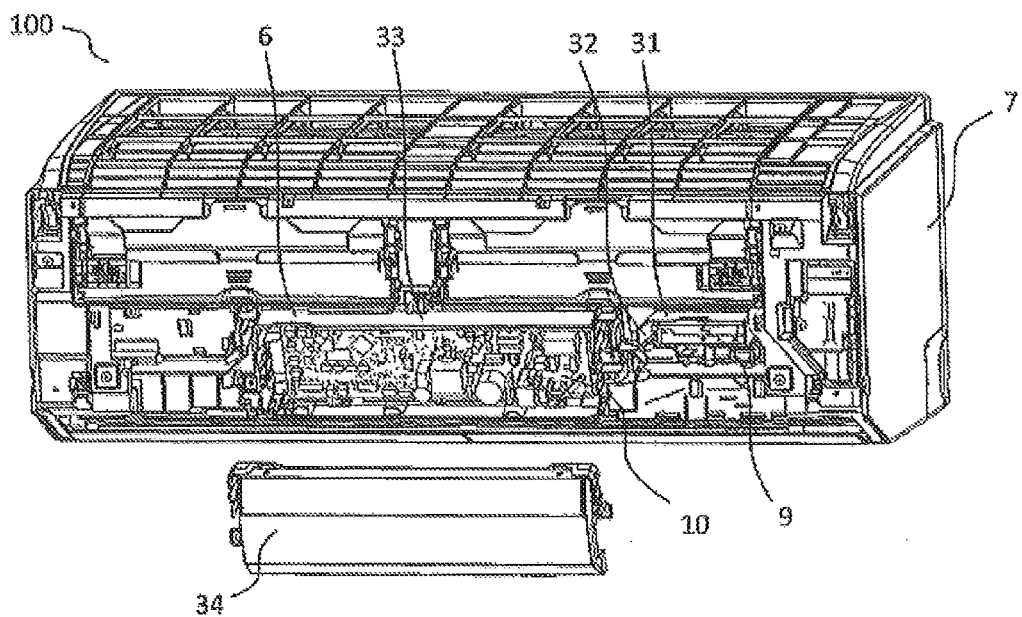
FIG. 6 is an exploded perspective view of the indoor unit of the air-conditioning apparatus according to Embodiment 1 of the present invention in a state in which the front panel and the wall of the housing are removed.

FIG. 4 is a perspective view of the indoor unit of the air-conditioning apparatus according to Embodiment 1 of the present invention in a state in which the front panel is removed. FIG. 5 is a cross-sectional view of the indoor unit of the air-conditioning apparatus according to Embodiment 1 of the present invention at an opening formed on the wall of the housing. FIG. 6 is an exploded perspective view of the indoor unit of the air-conditioning apparatus according to Embodiment 1 of the present invention in a state in which the front panel and the wall of the housing are removed. In FIGS. 4 and 5, the network repeater 9 is not shown.

As illustrated in FIGS. 4 to 6, the opening 22 is formed on the wall 21 of the housing 7. On a rear side of the wall 21, the electrical component compartment member 6 is disposed. On the electrical component compartment member 6, a network repeater compartment 31 having a box shape with a front side open is formed. The opening 22 is formed at a position faced with an opening of the network repeater compartment 31. The network repeater 9 is contained in a space 32 inside the network repeater compartment 31. Specifically, the opening 22 leads to a front end of the space 32 in which the network repeater 9 is contained.

Moreover, on the electrical component compartment member 6, a control board compartment 33 having a box shape with a front side open is formed. In the control board compartment 33, the control board 10 is contained. The control board compartment 33 is covered with a control board compartment cover 34. The control board compartment cover 34 is capable of being removed.

In other words, by removing the front panel 8, the wall 21 of the housing 7, and the control board compartment cover 34 of the electrical component compartment member 6 of the indoor unit 100 of the air-conditioning apparatus, the cable 9a extending from the network repeater 9 can be connected to the control board 10. Removal of the wall 21 of the housing 7 and the control board compartment cover 34 of the electrical component compartment member 6 may or may not be capable of being performed by the user.

Figure 7:
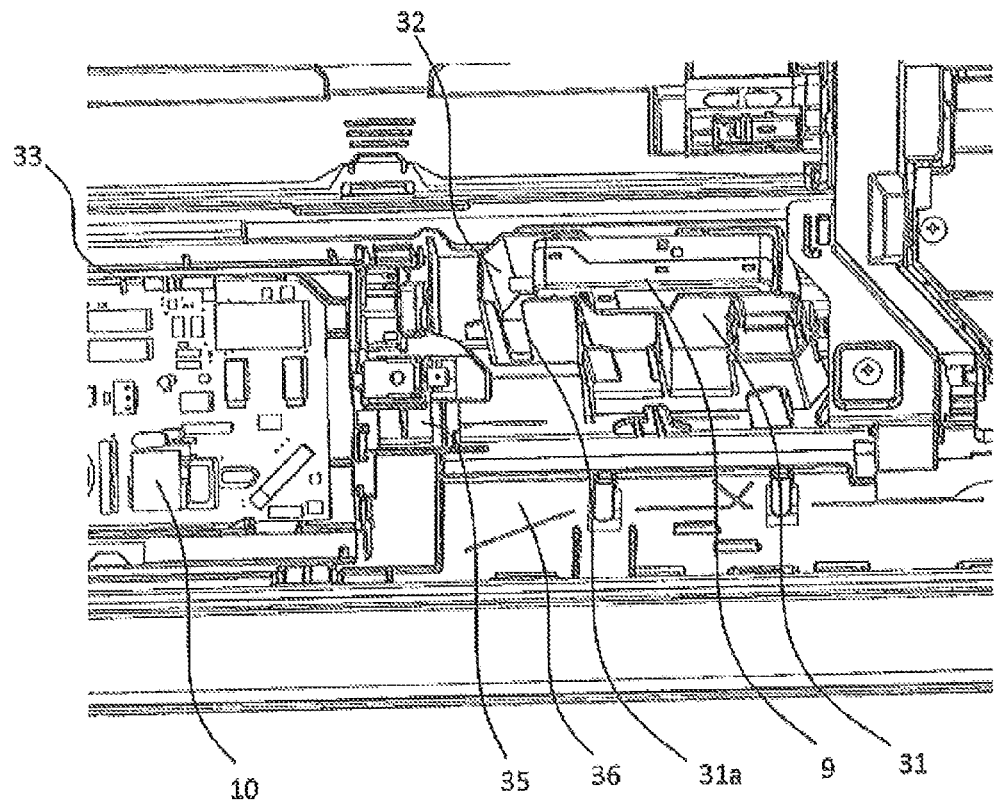
FIG. 7 is a perspective view of an essential part of the indoor unit of the air-conditioning apparatus according to Embodiment 1 of the present invention in a state in which the front panel, the wall of the housing, and a control board compartment cover of an electrical component compartment member are removed.
Figure 8:
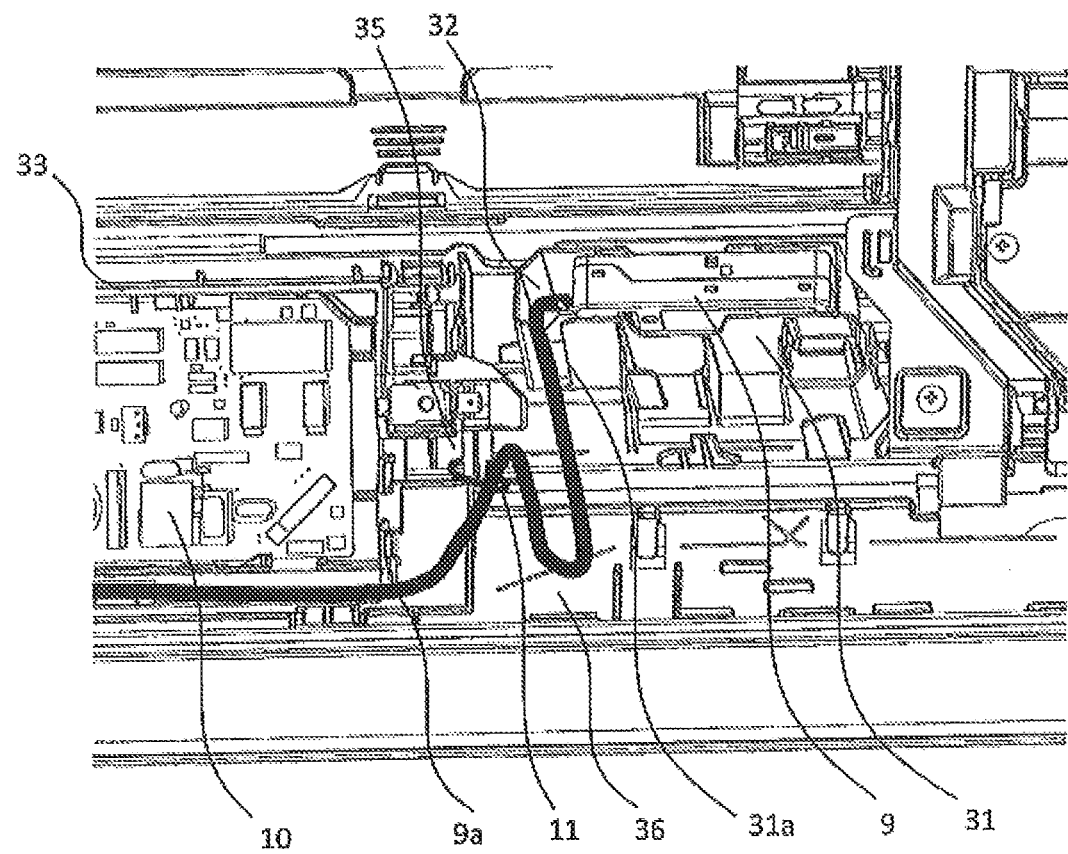
FIG. 8 is a perspective view of the essential part of the indoor unit of the air-conditioning apparatus according to Embodiment 1 of the present invention in a state in which the front panel, the wall of the housing, and the control board compartment cover for the electrical component compartment member are removed.

FIGS. 7 and 8 are perspective views of essential parts of the indoor unit of the air-conditioning apparatus according to Embodiment 1 of the present invention in a state in which the front panel, the wall of the housing, and the control board compartment cover of the electrical component compartment member are removed. FIG. 7 illustrates a state before the cable 9a of the network repeater 9 is wired, and FIG. 8 illustrates a state after the cable 9a of the network repeater 9 is wired.

As illustrated in FIGS. 7 and 8, at a position close to the control board compartment 33 in a peripheral wall of the network repeater compartment 31, a groove 31a in which a front side is open is formed. The opening of the groove 31a is covered with the wall 21 of the housing 7. Moreover, at a position located between the network repeater compartment 31 and the control board compartment 33 of the electrical component compartment member 6, a cable fixing member fixing portion 35 for attaching a cable fixing member 11 is formed. The cable fixing member 11 is a cable tie, and the cable fixing member fixing portion 35 is a hole, for example. Moreover, below the network repeater compartment 31 of the electrical component compartment member 6, a cable compartment space 36 is formed.

The cable 9a extending from the network repeater 9 is wired to pass inside the groove 31a and to reach the cable compartment space 36. Moreover, a middle portion of the cable 9a is fixed by the cable fixing member 11 attached at the cable fixing member fixing portion 35. Moreover, a tip end of the cable 9a is connected to the control board 10. After a portion of the cable 9a between a section fixed by the cable fixing member 11 and the network repeater 9 is contained in the cable compartment space 36 in a state in which a sufficient extra length remains, the wall 21 of the housing 7 is installed. In other words, the cable 9a has a length sufficient for drawing out the network repeater 9 contained in the space 32 through the opening 22 formed in the wall 21 of the housing 7, and a portion of the cable 9a between the section fixed by the cable fixing member 11 and the network repeater 9 has a length sufficient for drawing out the network repeater 9 contained in the space 32 through the opening 22 formed in the wall 21 of the housing 7.

The cable fixing member fixing portion 35 may be formed in the network repeater compartment 31. In other words, the cable fixing member 11 may fix a portion of the cable 9a between a section located inside the groove 31 a and the network repeater 9 and in such a case, it is only necessary that the cable compartment space 36 is formed inside the network repeater compartment 31.

Figure 9:
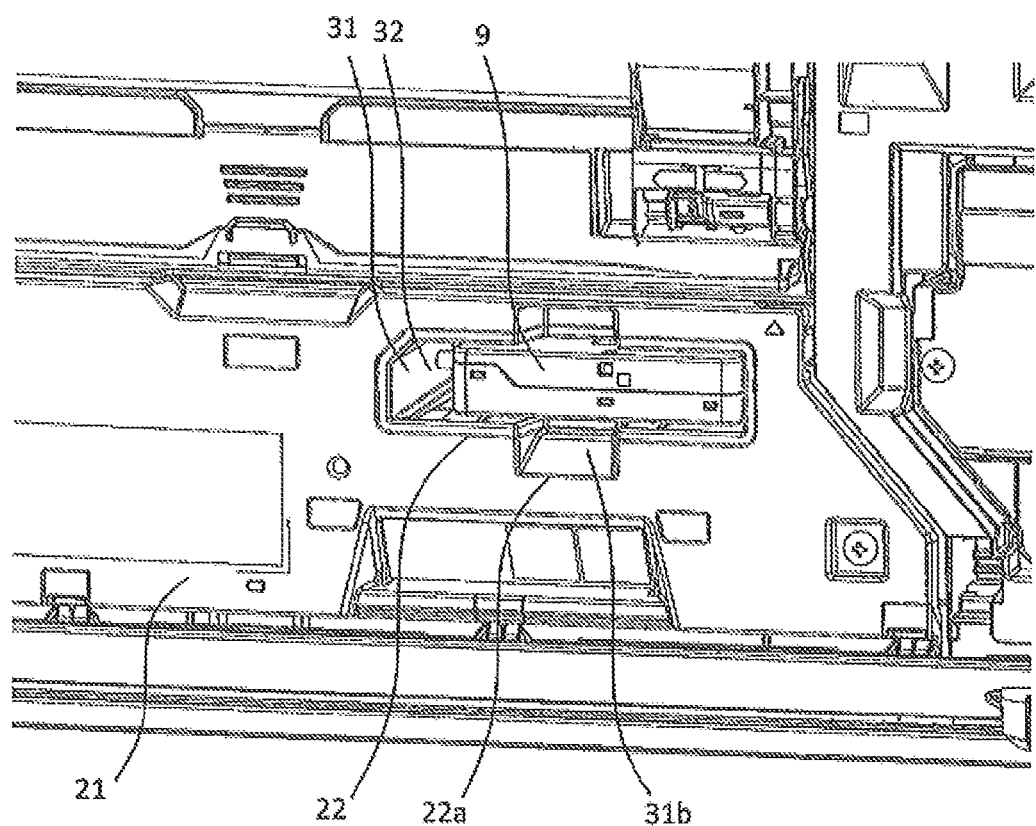
FIG. 9 is a perspective view of the essential part of the indoor unit of the air-conditioning apparatus according to Embodiment 1 of the present invention in a state in which the front panel is removed.

FIG. 9 is a perspective view of an essential part of the indoor unit of the air-conditioning apparatus according to Embodiment 1 of the present invention in a state in which the front panel is removed.

As illustrated in FIG. 9, a cutout 22a is formed in each of regions facing each other on a peripheral edge of the opening 22 in the wall 21 of the housing 7. Moreover, at a position corresponding to the cutout 22a on the peripheral wall of the network repeater compartment 31 of the electrical component compartment member 6, a stepped portion 31b is formed. The user can put fingers into the cutouts 22a and the stepped portions 31b and hold the network repeater 9. FIG. 9 illustrates a case in which the cutouts 22a and the stepped portions 31b are formed in the vertical direction of the network repeater 9; however the configuration is not limited to this case. For example, the cutout 22a and the stepped portion 31b may be formed in the horizontal direction of the network repeater 9.

<Action of Indoor Unit of Air-Conditioning Apparatus>

An action of the indoor unit of the air-conditioning apparatus according to Embodiment 1 will be described.

In the indoor unit 100 of the air-conditioning apparatus, in the region covered with the front panel 8 of the wall 21 of the housing 7, the opening 22 leading to the front end of the space 32 in which the network repeater 9 for wirelessly communicating with the network is contained is formed, and the opening 22 is exposed in the state in which the front panel 8 is removed. Thus, the interior aesthetics can be improved by incorporating the network repeater 9 in the indoor unit 100 of the air-conditioning apparatus. Moreover, the network repeater 9 incorporated in the indoor unit 100 of the air-conditioning apparatus can be taken out of the indoor unit 100 of the air-conditioning apparatus for visual check and operations as necessary, ensuring the functionality.

Moreover, in the indoor unit 100 of the air-conditioning apparatus, the control board 10 and the network repeater 9 are connected by the cable 9a disposed on the rear side of the wall 21 of the housing 7, and the cable 9a has a length sufficient for drawing out the network repeater 9 contained in the space 32 through the opening 22. Thus, when the network repeater 9 is to be taken out of the indoor unit 100 of the air-conditioning apparatus, removal of the cable 9a from the control board 10, application of a load to a connection portion of the cable 9a connected with the control board 10, and the like are suppressed, and usability for the user is improved.

Moreover, in the indoor unit 100 of the air-conditioning apparatus, the middle portion of the cable 9a is fixed by the cable fixing member 11, and the portion of the cable 9a between the section fixed by the cable fixing member 11 and the network repeater 9 has a length sufficient for drawing out the network repeater 9 contained in the space 32 through the opening 22. Thus, when the network repeater 9 is to be taken out of the indoor unit 100 of the air-conditioning apparatus, the removal of the cable 9a from the control board 10, the application of a load to a connection portion of the cable 9a connecting with the control board 10, and the like are further suppressed, and the usability for the user is further improved.

Moreover, in the indoor unit 100 of the air-conditioning apparatus, the cutout 22a is formed in each of the regions facing each other on the peripheral edge of the opening 22. Thus, when the network repeater 9 is to be taken out of the indoor unit 100 of the air-conditioning apparatus, the network repeater 9 can be held by the fingers, and the usability for the user is improved.

<Variation>

The above describes a case in which the network repeater 9 is contained in the space 32 in a state in which the surface on which the indication lamps 9b and the switches 9c and 9d are not disposed is located on the opening 22 side; however, the network repeater 9 may be contained in the space 32 in a state in which the surface on which the indication lamps 9b and the switches 9c and 9d are disposed is located on the opening 22 side. In such a case, the visual check, the operation and the like can be performed without taking out the network repeater 9 from the indoor unit 100 of the air-conditioning apparatus and thus, the usability for the user is improved. Moreover, a case in which the indication lamps 9b and the switches 9c and 9d are disposed on the front of the network repeater 9 is described; however, the indication lamps 9b and the switches 9c and 9d may be disposed on a surface other than the front of the network repeater 9.

The above describes a case in which the front panel 8 covers a whole front of the housing 7; however, the front panel 8 may cover a part of the housing 7 and it is only necessary that at least the region where the opening 22 of the wall 21 is formed is covered. Moreover, a case in which the opening 22 formed in the wall 21 of the housing 7 is exposed by removing the front panel 8 is described; however, the opening 22 formed in the wall 21 of the housing 7 may be exposed by removing a part of the front panel 8, or the opening 22 formed in the wall 21 of the housing 7 may be exposed by automatically or manually opening of the whole or a part of the front panel 8.

REFERENCE SIGNS LIST 1 base 2 fan 3 heat exchanger 4 drain pan assembly 4a vertical wind direction adjustment plate 5 filter automatic cleaning unit 6 electrical component compartment member 7 housing 8 front panel 9 network repeater 9a cable 9b indication lamp 9c, 9d switch 10 control board 11 cable fixing member 21 wall 22 opening 22a cutout 31 network repeater compartment 31a groove 31b stepped portion 32 space 33 control board compartment 34 control board compartment cover 35 cable fixing member fixing portion 36 cable compartment space 100 indoor unit of air-conditioning apparatus

The invention claimed is:

1. An indoor unit of an air-conditioning apparatus comprising:
    a housing having a wall extending in a horizontal direction; and
    a front panel, wherein
    the front panel is installed on a front side of the housing and covers at least a part of a front side of the wall,
    in the indoor unit, in a region of the wall covered by the front panel, an opening leading to a front end of a space in which a network repeater for wirelessly communicating with a network is to be contained is formed in such a manner that, on a rear side of the wall, a network repeater compartment with a front side open is formed, that the opening of the wall is formed at a position faced with an opening of the network repeater compartment, that the network repeater is to be contained in the space inside the network repeater compartment, and that the network repeater can be incorporated in the indoor unit, and
    the opening in the wall being configured to be exposed in a state in which a whole or a part of the front panel is removed or opened, so that the network repeater incorporated in the indoor unit can be taken out of the indoor unit.

2. The indoor unit of the air-conditioning apparatus of claim 1, further comprising a control board, and the network repeater contained in the space and configured to relay the control board and the network.

3. The indoor unit of the air-conditioning apparatus of claim 2, wherein
    the control board and the network repeater are connected by a cable disposed on a rear side of the wall, and
    the cable has a length sufficient for drawing out the network repeater contained in the space through the opening.

4. The indoor unit of the air-conditioning apparatus of claim 3, wherein
    a middle portion of the cable is fixed by a cable fixing member, and
    a portion of the cable between the middle portion and the network repeater has a length sufficient for drawing out the network repeater contained in the space through the opening.

5. The indoor unit of the air-conditioning apparatus of claim 1, wherein a cutout is formed in each of regions facing each other on a peripheral edge of the opening.

6. The indoor unit of the air-conditioning apparatus of claim 1, wherein the network repeater performs Wi-Fi communication with the network.

* * * * *